US012160286B2

(12) United States Patent
Sun et al.

(10) Patent No.: US 12,160,286 B2
(45) Date of Patent: Dec. 3, 2024

(54) WIRELESS COMMUNICATION SYSTEMS AND METHODS USING VIRTUALIZATION ACROSS A HORIZONTAL AND/OR VERTICAL POLARIZATION

(71) Applicant: APPLE INC., Cupertino, CA (US)

(72) Inventors: Haitong Sun, Cupertino, CA (US); Chunhai Yao, Beijing (CN); Chunxuan Ye, San Diego, CA (US); Dawei Zhang, Cupertino, CA (US); Hong He, Cupertino, CA (US); Oghenekome Oteri, San Diego, CA (US); Pengkai Zhao, Cupertino, CA (US); Sigen Ye, Cupertino, CA (US); Wei Zeng, Cupertino, CA (US); Weidong Yang, San Diego, CA (US); Wen Zhao, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 434 days.

(21) Appl. No.: 17/593,621

(22) PCT Filed: Apr. 14, 2021

(86) PCT No.: PCT/CN2021/087184
§ 371 (c)(1),
(2) Date: Sep. 21, 2021

(87) PCT Pub. No.: WO2022/028000
PCT Pub. Date: Feb. 10, 2022

(65) Prior Publication Data
US 2022/0311478 A1  Sep. 29, 2022

(30) Foreign Application Priority Data
Aug. 6, 2020 (WO) ................ PCT/CN2020/107493

(51) Int. Cl.
*H04B 7/0413* (2017.01)
*H04B 7/10* (2017.01)
(Continued)

(52) U.S. Cl.
CPC ............. *H04B 7/0413* (2013.01); *H04B 7/10* (2013.01); *H04L 5/0048* (2013.01); *H04L 41/40* (2022.05)

(58) Field of Classification Search
CPC ...... H04B 7/0413; H04B 7/10; H04B 7/0469; H04B 7/0695; H04B 7/0617;
(Continued)

(56) References Cited

U.S. PATENT DOCUMENTS 10,051,511 B1 * 8/2018 Mehta et al. ..... H04W 28/0284
10,506,608 B1 * 12/2019 Zhou et al. ....... H04W 72/0486
(Continued)

FOREIGN PATENT DOCUMENTS

CN        107624225 A     1/2013

OTHER PUBLICATIONS

Yuki et al. (JP 2013042341 A) >>> Radio Communication System, Radio Base Station, and Radio Communication Method (see title). (Year: 2013).*
(Continued)

*Primary Examiner* — Meless N Zewdu
(74) *Attorney, Agent, or Firm* — Dorsey & Whitney LLP

(57) ABSTRACT

Various systems and methods disclosed herein describe improvements for beam management that leverage virtualization across a vertical polarization (V-Pol) and horizontal polarization (H-Pol). One or more of a user equipment (UE) and a base station may include an antenna array comprising both V-Pol and H-Pol antenna elements. A UE may message a base station to configure uplink (UL) multiple input multiple output (MIMO) operations across one or more of
(Continued)

the V-Pol and the H-Pol. The message may include a number of MIMO layers to be concurrently used for communicating data to the base station, where each MIMO layer is transmitted using one of a V-Pol and an H-Pol; a number of sounding reference signals (SRS) to be transmitted by the UE, each SRS to be transmitted using one of the V-Pol and the H-Pol; and a supported maximum number of antenna ports per each SRS.

18 Claims, 7 Drawing Sheets

(51) Int. Cl.
*H04L 5/00* (2006.01)
*H04L 41/40* (2022.01)

(58) Field of Classification Search
CPC ........ H04B 7/0456; H04B 7/06; H04B 7/024; H04B 7/0453; H04B 7/0495; H04B 7/02; H04B 7/0452; H04B 7/0404; H04L 5/0048; H04L 41/40; H04L 5/001; H04L 5/04; H04L 5/00; H04L 5/0035; H04L 1/00; H04L 5/003; Y02D 30/70; H04W 72/231; H04W 72/232; H04W 36/00692; H04W 72/20; H04W 72/21; H04W 72/23; H04W 72/121; H04W 76/00; H04W 76/10; H04W 76/11; H04W 76/15; H04W 88/00; H04W 88/02; H04W 88/08; H04W 72/04

See application file for complete search history.

(56) References Cited

U.S. PATENT DOCUMENTS

| | | | |
|---|---|---|---|
| 10,623,070 B1* | 4/2020 | Raghunathan et al. | ..................... H04B 7/0473 |
| 10,790,885 B1* | 9/2020 | Raghunathan et al. | ..................... H04B 7/0452 |
| 11,146,987 B1* | 10/2021 | Marupaduga | ..... H04W 28/0278 |
| 11,438,948 B1* | 9/2022 | Oroskar et al. | ....... H04W 76/15 |
| 2012/0328031 A1 | 12/2012 | Pajukoski et al. | |
| 2014/0241192 A1* | 8/2014 | Kim et al. | ............ H04L 5/0057 |
| 2015/0381282 A1 | 12/2015 | Zhang et al. | |
| 2018/0041981 A1* | 2/2018 | Wu | ........................ H04W 60/04 |
| 2018/0063693 A1 | 3/2018 | Chakraborty | |
| 2019/0123788 A1* | 4/2019 | Park et al. | ........... H04B 7/0413 |

OTHER PUBLICATIONS

Yeh Choong Il et al. (KR 20140089312 A) >>> Method for Transmitting Signal Using Multiple Antennas (see title). (Year: 2014).*
Uemura et al. (WO 2012176703 A1) >>> Mobile Station Device, Base Station Device, Communication System, Mobile Station Device Capacity Notification Method, and Integrated Circuit (see title). (Year: 2012).*
Llu et al. (CN 112514297 A) >>> SRS Configuration And SRS Transmission (title). (Year: 2021).*
Soul, et al. (CN 102388659 A) >>> System And Method Of Multi-input/multi-output In Wireless Network For Communication Information Frequency Deviation (see title). (Year: 2012).*
Harrison et al. (WO 2020075090 A1) >>> Full Power UL MIMO Via Multiple SRS Resource Groups (see title). (Year: 2020).*
Intel Corporation et al., "Release-16 UE capabilities based on RAN1, RAN4 feature lists and RAN2", R2-2005818, 3GPP TSG RAN WG2 Meeting #110e, Change Request 38.306 CR 0329 rev 1, current version 16.0.0, Jun. 1-12, 2020, 92 pages.
Intel Corporation et al., "Release-16 UE capabilities based on RAN1, RAN4 feature lists and RAN2", RP-201217, 3GPP TSG RAN Meeting #88e, Change Request 38.306 CR 0329 Current Version 16.0.0, Jun. 29-Jul. 3, 2020, 92 pages.
Intel Corporation et al., "UE capabilities for RAN1 and RAN4 feature list", R2-2005785, 3GPP TSG RAN WG2 Meeting #110e, Change Request 38.306, Current version 16.0.0, Jun. 1-12, 2020, 51 pages.
Intel Corporation et al., "UE capabilities for RAN1 and RAN4 feature list", R2-2005314, 3GPP TSG RAN WG2 Meeting #110e, Change Request 38.306 CR 0329, Current version 16.0.0, Jun. 1-12, 2020, 51 pages.
Nokia et al., "Switching period between case 1 and case 2 for two NR FR1 carriers", R4-1914271, 3GPP TSG-RAN WG4 Meeting #93, Reno, Nevada, Agenda Item 9.13.1.6, Nov. 18-22, 2019, 7 pages.
WIPO, International Search Report and Written Opinion, PCT/CN2021/087184, Jul. 14, 2021, 9 pages.
ZTE Corporation et al., "CR on unnecessary XDD FRX differentiation", R2-2006116, 3GPP TSG-RAN WG2 Meeting #110e, Change Request 38.306 CR 0353, Current Version 16.0.0, Jun. 1-12, 2020, 44 pages.

* cited by examiner

WIRELESS COMMUNICATION SYSTEMS AND METHODS USING VIRTUALIZATION ACROSS A HORIZONTAL AND/OR VERTICAL POLARIZATION

TECHNICAL FIELD

This application relates generally to wireless communication systems, including systems and methods using virtualization across a horizontal polarization and a vertical polarization.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NO-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

DETAILED DESCRIPTION

Figure 1:
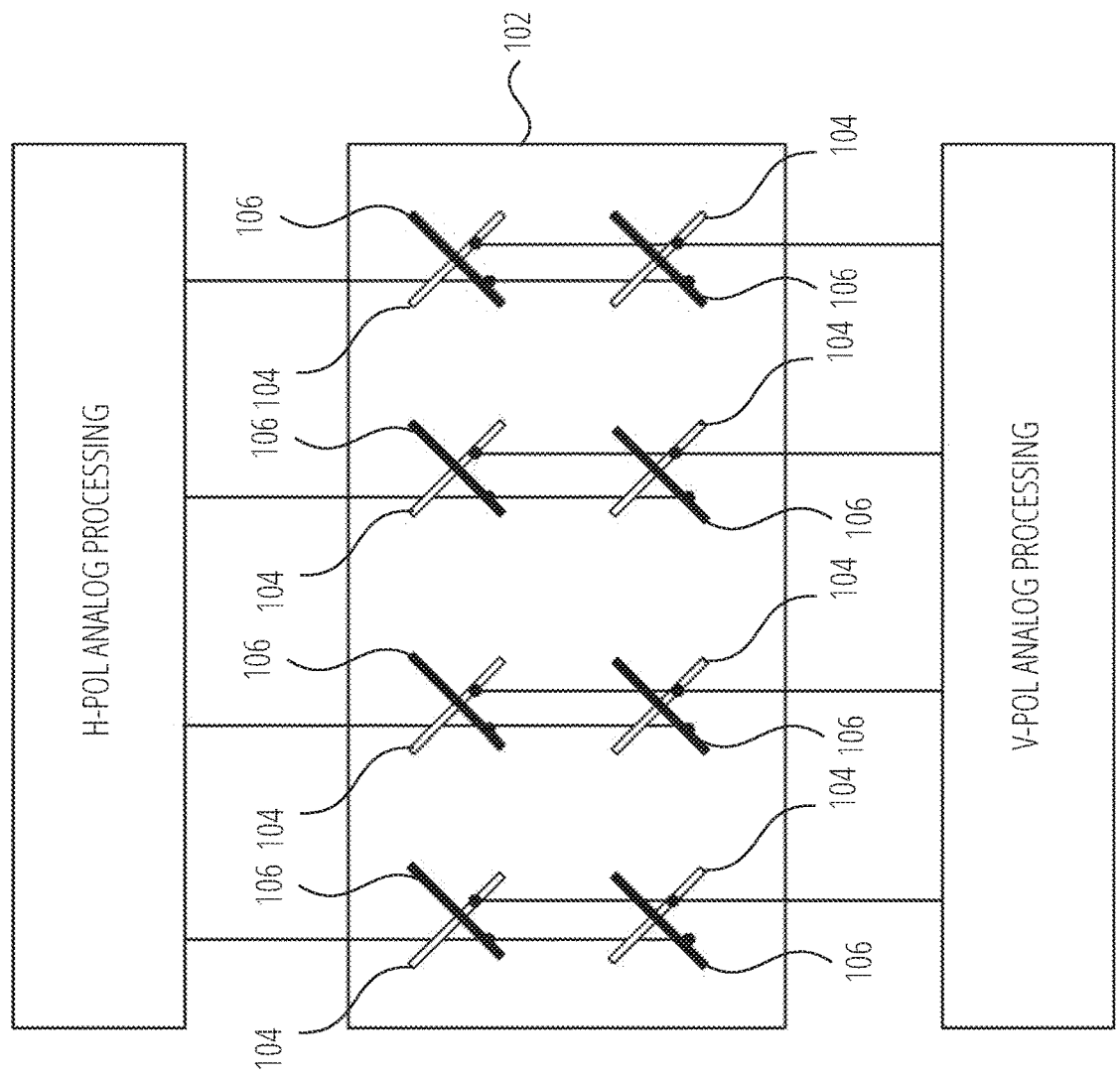
FIG. 1 illustrates an antenna panel that is configured for V-Pol and H-Pol communications, according to an embodiment.

Beam management at both the UE side and the base station side is a useful consideration in NR systems. Such considerations may be particularly salient in FR2, where beamforming may be required in some cases. Beam management considerations may include one or more of beam measurement, beam reporting, beam configuration (and related indications) and beam failure recovery. Beam measurement, beam configuration (along with related indications), and beam failure recovery may be largely base station driven, while beam reporting may be largely UE driven.

During a beam report by a UE, the UE may report information regarding one or more beams to the base station. It is recognized that NR supports periodic, aperiodic, and/or semi-persistent reference signals; periodic, aperiodic, and/or semi-persistent beam reporting; and group based and non-group based beam reporting. NR further supports the use, in a beam report, of a UE communication to a base station of one or more beam indexes/transmission configuration indications (TCIs) (e.g., a synchronization signal/physical broadcast channel block (SSB) resource indicator (SSBRI) and/or channel state information reference signal (CSI-RS) resource indicator (CRI)) and corresponding reference signal received power (RSRP) information, reference signal received quality (RSRQ) information, and/or signal-to-interference-plus-noise ratio (SINR) level(s).

In group-based beam reporting, the UE reports the quality of G groups of beams and in each group, K beams are reported. The beams in a group may be simultaneously received, or beams across groups may be simultaneously received. In some aspects, the Layer 1 (L1)-RSRQ/L1-SINR can be reported in either non-group-based beam reporting or group-based beam reporting or both. In one option, the UE reports the L1-RSRQ/L1-SINR for each of the beams. In another aspect, the UE reports the L1-RSRQ/L1-SINR for X best bearn(s) and the differential L1-RSRQ/L1-RSRP for the other beams, where X could be fixed, e.g., 1, for non-group based beam reporting, and X could be 1 or equal to the number of groups or number of beams within a group for group-based beam reporting. In some aspects, if X>1 for group-based beam reporting, the differential L1-RSRQ/L1-SINR can be based on the reference beam in the same group or the same index within a group.

Given the fact that the beam measurement, beam configuration (and related indications), and beam failure recovery may be largely base station driven, it may be fairly said that beam management may be largely base station driven. However, it has been observed that, under the above conditions, the base station may not (at least initially) have complete information regarding a UE radio frequency (RF) and/or UE codebook information useful for efficiently performing beam management.

In practice, it may be desirable due to considerations at the UE to implement more advanced beam management processes than those described above (and/or improvements to the beam management processes described above). These more advanced/improved processes may enable to the UE to have a greater effect on beam management than in those prior systems.

It has been observed that beam management may be improved by leveraging one or more of: the use of hybrid analog and digital beam forming, the use of dynamic codebook sizes; the use of virtualization across a vertical polarization (V-Pol) and a horizontal polarization (H-Pol); and the use of dynamic antenna element activation and deactivation. Herein, enhancements to various beam management procedures (e.g., uplink (UL) multiple input multiple output (MIMO) enhancements) are described which leverage considerations from one or more of these.

Some embodiments disclosed herein relate particularly to, e.g., V-Pol and H-Pol considerations. FIG. 1 illustrates an antenna panel 102 that is configured for V-Pol and H-Pol communications, according to an embodiment. The antenna panel 102 may include one or more V-Pol antenna elements 104 and one or more H-Pol antenna elements 106. The V-Pol antenna elements 104 and the H-Pol antenna elements 106 may be set orthogonally to one another. Thus, when data is transmitted using one or more of the V-Pol antenna elements 104, the electric field so generated will be orthogonal to the electric field generated when data is transmitted using one or more of the H-Pol antenna elements 106. The antenna panel 102 (or one like it, with a different number of elements) may be found on either or both of a UE and a base station in systems and methods described below. Data transmitted/received on the V-Pol antenna elements 104 is said to be transmitted/received using V-Pol and data transmitted/received on the H-Pol antenna elements 106 is said to be transmitted/received using H-Pol.

A UE may implement and perform UL MIMO transmissions. MIMO transmissions may allow for the transmission of multiple data streams in the same wireless channel, with each data stream being sent on an individual MIMO layer. UL MIMO operations may be codebook based or non-codebook based.

For non-codebook based UL MIMO operations, the UE may indicate to the base station a number of MIMO layers to be concurrently used for communicating data to the base station. This may be indicated in, e.g., a "maxNumber-MIMO-LayersNonCB-PUSCH" parameter. The UE may also indicate a number of sounding reference signals (SRS) to be transmitted by the UE to the base station. This may be indicated in, e.g., a "maxNumberSRS-ResourcePerSet" parameter. The UE may also indicate a supported maximum number of antenna ports per each SRS. This may be indicated in an "maxNumberSRS-Ports-PerResource" parameter.

For codebook based UL MIMO operations, the UE may indicate to the base station a number of MIMO layers to be concurrently used for communicating data to the base station. This may be indicated in, e.g., a "maxNumberMIMO-LayersCB-PUSCH" parameter. The UE may also indicate a number of sounding reference signals (SRS) to be transmitted by the UE to the base station. This may be indicated in, e.g., a "maxNumberSRS-ResourcePerSet" parameter. The UE may also indicate a supported maximum number of antenna ports per each SRS. This may be indicated in an "maxNumberSRS-Ports-PerResource" parameter. A "pusch-TransCoherence" parameter may also be transmitted. This parameter may indicate whether and a what level the UE implements RF and baseband calibration between different antenna ports in order to ensure that phase coherency can be maintained.

One way to support one or more MIMO layers on the UL, is via V-Pol and H-Pol virtualization, where each of one or more MIMO layers (sometimes referred to below as simply "layers") is transmitted using one of the V-Pol and the H-Pol. One benefit of doing so is that this leverages the orthogonality between the V-Pol and the H-Pol described above, leading to a reduction in interference between MIMO layers transmitted on different polarities. This virtualization may also be compatible with a natural separating between digital and analog processing. For example, within a single polarization, analog beam forming can be used, for which the support of multiple MIMO layers may be more complex as compared to using two different polarizations, where digital precoding can be used to support multi-layer MIMO operation.

It has further been recognized that allowing the UE to signal, to the base station, a number of MIMO layers to be concurrently used, a number of SRS to be transmitted, and a supported maximum number of antenna ports per SRS, the UE can control the characteristics of the MIMO application across the V-Pol and the H-Pol. This allows the UE to configure the MIMO operation according to current data needs and for current strengths of the V-Pol and the H-Pol (which the UE may gauge from the SINR and/or RSRP of signals received at the LTE using each of the V-Pol and the H-Pol in the DL), as will be described in additional detail below. Benefits of UE configuration may include that the UE can control its own power and thermal characteristics (as the activation of multiple polarizations may consume more power and/or cause the UE to dissipate more heat).

In some cases, the UE may determine, for non-codebook based UL MIMO operation, to perform UL MIMO with a single layer at a time. This may allow the UE to use only one of the V-Pol or the H-Pol to present the MIMO layer to the UE, or it may allow the UE to perform a transparent transmit (Tx) diversity scheme across both V-Pol and H-Pol. In these cases, the UE indicates that the number of layers to be concurrently used for communicating UL data to the base station is one. The UE further indicates that the number of SRS to be transmitted is one. The UE further indicates that the supported maximum number of antenna ports per each SRS is one. In this case, (when using one of the V-Pol or the H-Pol to present the MIMO layer) the one SRS and the one MIMO layer to be used are transmitted using the same polarization.

In some cases, the UE may determine, for either non-codebook base UL MIMO operation or codebook based UL operation, to perform UL MIMEO with a single layer at a time, but with the option to switch between transmitting a layer using the V-Pol or transmitting a layer using the H-Pol. This may be useful in dynamic cases where one or the other of the V-Pol or the H-Pol alternate being the stronger polarization for UL. In these cases, the UE indicates that the number of layers to be concurrently used for communicating UL data to the base station is one. The UE further indicates that the number of SRS to be transmitted is two (e.g., one transmitted using the V-Pol, and one transmitted using the H-Pol, and each transmitted whenever the respective polarization is being used to transmit a layer). The UE further indicates that the supported maximum number of antenna ports per each SRS is one (meaning that the subcases of these cases where the network is configured to use codebook UL operation will look similar to the non-codebook cases). In some of these cases, the UE may select between transmitting a layer using the V-Pol and transmitting a layer using the H-Pol based on instructions from the base station. In some of these cases, the UE may select between transmitting a layer using the V-Pol and transmitting a layer using the ITI-Pol based on changes in relative strengths between the V-Pol and the H-Pol (which the UE may gauge from the SINR and/or RSRP of signals received at the LIE using each of the V-Pol and the H-Pol in the DL).

In some cases, the UE may determine, for non-codebook based UL NIIMO operation, to perform UL MIMO by dynamically choosing between the use of one layer using either of the V-Pol or H-Pol or two layers (with one layer using each of the V-Pol and the H-Pol) as conditions change. This may be useful in dynamic cases where conditions alternate between the V-Pol being stronger than the H-Pol, the H-Pol being stronger than the V-Pol, and/or the V-Pol and the H-Pol having similar strengths. In these cases, the UE may indicate that the number of layers to be concurrently used for communicating data to the base station is two when the V-Pol and the H-Pol are of similar strengths, or the UE may indicate that the number of layers to be concurrently used for communicating data to the base station is one when the V-Pol and the H-Pol are of dissimilar strengths. The UE further indicates that the number of SRS to be transmitted is two (e.g., one transmitted using the V-Pol, and one transmitted using the H-Pol, and transmitted whenever the respective polarization is being used to transmit a layer). The UE further indicates that the supported maximum number of antenna ports per each SRS is one.

In some cases, the UE may determine, for codebook based UL MIMO operation, to perform UL MIMO by dynamically choosing between the use of one layer using either of the V-Pol or H-Pol or two layers (with one layer using each of the V-Pol and the H-Pol) as conditions change. This may be useful in dynamic cases where conditions alternate between the V-Pol being stronger than the H-Pol, the H-Pol being stronger than the V-Pol, and/or the V-Pol and the H-Pol having similar strengths. In these cases, the UE may indicate that the number of layers to be concurrently used for communicating data to the base station is two when the V-Pol and the H-Pol are of similar strengths, or the UE may indicate that the number of layers to be concurrently sued for communicating data to the base station is one when the V-Pol and the H-Pol are of dissimilar strengths. The UE further indicates that the number of SRS to be transmitted is one (e.g., the same SRS resource is transmitted using the V-Pol and the H-Pol, whenever the such polarization is being used to transmit a layer). The UE further indicates that the supported maximum number of antenna ports per each SRS is two. The indication of the use of one SRS across two antenna ports per each SRS may correspond to the codebook nature of the codebook based UL MIMO operation, and/or may indicate to the base station that the UE wishes to use a codebook based UL MIMO operation.

In either of the non-codebook or codebook based cases and when configured to dynamically choose between using one and two concurrent layers, when the number of layers to be concurrently used for communicating data to the base station is one, the UE may be configured to select between a use of a first layer for communicating data to the base station transmitted using the V-Pol and a second layer for communicating data to the base station transmitted using the H-Pol. This selection may be made based on whether the V-Pol or the H-Pol is stronger (which the UE may gauge from the SINR and/or RSRP of signals received at the UE using each of the V-Pol and the H-Pol in the DL).

Further, in either of the non-codebook or codebook based cases and when configured to dynamically choose between using one and two concurrent layers, a UE may later determine that a relative strength between the V-Pol and the H-Pol has changed; and, in response, indicate a second number of layers to be concurrently used for transmitting data to the base station, each of the second number of layers to be transmitted using one of the V-Pol and the H-Pol. Because of the change in relative strengths of the V-Pol and the H-Pol, it is anticipated that this second indication may be different than the first indication of a number of layers to be concurrently used for communicating data to the base station. For example, if the first indication was for the use of one concurrent layer, and the V-Pol and the H-Pol have since come closer in relative strength, the second indication may be for the use of two concurrent layers. As another example, if the first indication was for the use of two concurrent layers, and the V-Pol and the H-Pol have since grown apart in relative strength, the second indication may be for the use of one concurrent layer.

In embodiments where a UE may first indicate a number of layers to be concurrently used for communicating data to the base station and subsequently indicate a second number of layers to be concurrently used for communicating with the base station, an indication of a second number of layers to be concurrently used for communicating data to the base station may comprise an indication of a preferred UL bandwidth part (BWP) for UL transmission in a second set of one or more messages communicating the second number of layers. The base station may know of an association between the indicated BWP and a number of layers, and may correspondingly determine that the UE has indicated for the use of that number of layers going forward, and make the change to the indicated preferred BWP using the associated number of layers. Some BWPs may be associated with a larger maximum number of layers (for higher peak data rate), while other BWPs may be associated with a smaller maximum number of layers (for power saving), and the UE may indicate the preferred BWP according to those considerations. Additionally (or alternatively), the indication of a second number of layers may arrive as part of an RRC message, a MAC-CE, and/or DCI. The base station may then confirm the dynamic change to the second number of layers to the UE using one or more of an RRC message, a MAC-CE, and/or DCI. It is anticipated that initial indication of a number of layers to be concurrently used for communicating data to the base station (e.g., an indication prior to any indication of a second number of layers to be concurrently used for communicating data to the base station) may also be handled in the described manner.

Figure 2:
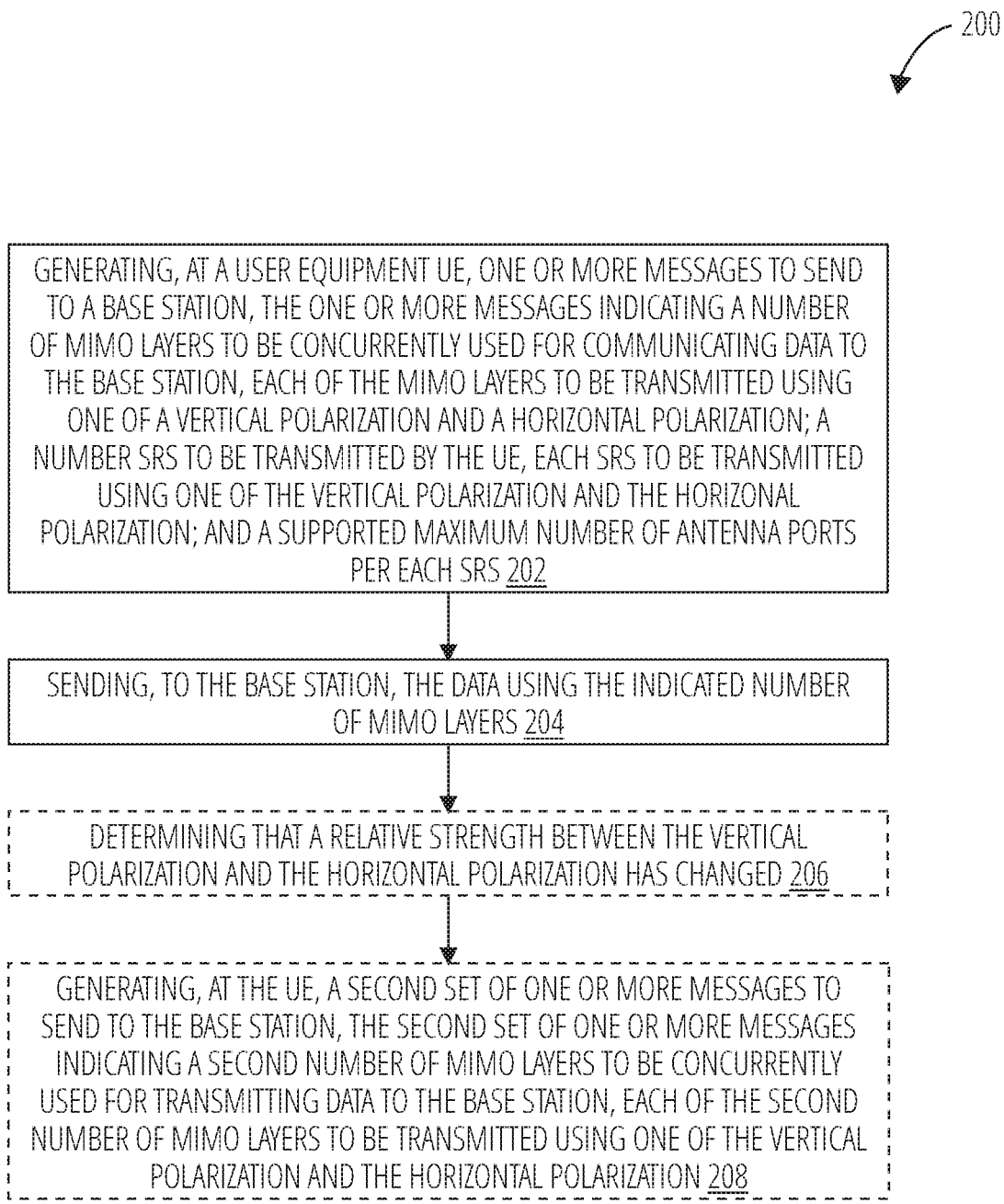
FIG. 2 illustrates a method of a UE for performing UL multiple input multiple output (MIMO) transmissions, according to an embodiment.

FIG. 2 illustrates a method 200 of a UE for performing UL MIMO transmissions, according to an embodiment. The method 200 includes generating 202, at a user equipment UE, one or more messages to send to a base station, the one or more messages indicating a number of MIMO layers to be concurrently used for communicating data to the base station, each of the MIMO layers to be transmitted using one of a vertical polarization and a horizontal polarization; a number SRS to be transmitted by the UE, each SRS to be transmitted using one of the vertical polarization and the horizontal polarization; and a supported maximum number of antenna ports per each SRS.

The method 200 further includes sending 204, to the base station, the data using the indicated number of MIMO layers.

The method 200 optionally further includes determining 206 that a relative strength between the vertical polarization and the horizontal polarization has changed.

The method 200 optionally further includes generating 208, at the UE, a second set of one or more messages to send to the base station, the second set of one or more messages indicating a second number of MIMO layers to be concurrently used for transmitting data to the base station, each of the second number of MIMO layers to be transmitted using one of the vertical polarization and the horizontal polarization.

In certain embodiments of the method 200, for non-codebook based UL MIMO transmissions: the number of MIMO layers to be concurrently used for communicating data to the base station is one; the number of SRS to be transmitted by the UE is one; the supported maximum number of antenna ports per each SRS is one; and the one SRS and the one MIMO layer to be used are transmitted using the same polarization.

In certain embodiments of the method 200, for either of non-codebook based UL MIMO transmissions and codebook based UL MIMO transmissions: the number of MIMO layers to be concurrently used for communicating data to the base station is one; the number of SRS to be transmitted by the UE is two; the supported maximum number of antenna ports per each SRS is one; and the UE is configured to select between a use of a first MIMO layer for communicating data to the base station transmitted using the vertical polarization and a second MIMO layer for communicating data to the base station transmitted using the horizontal polarization. In some of these embodiments, the selection between the first MIMO layer and the second MIMO layer occurs based on instructions from the base station. In some of these embodiments, the selection between the first MIMO layer and the second MIMO layer occurs based on changes in relative strengths between the vertical polarization and the horizontal polarization.

In certain embodiments of the method 200, for non-codebook based UL MIMO transmissions: the number of MIMO layers to be concurrently used for communicating data to the base station is two when the vertical polarization and the horizontal polarization are of similar strengths; the number of MIMO layers to be concurrently used for communicating data to the base station is one when the vertical polarization and the horizontal polarization are of dissimilar strengths; the number of SRS to be transmitted by the UE is two; and the supported maximum number of antenna ports per each SRS is one. In some of these embodiments, when the number of MIMO layers to be concurrently used for communicating data to the base station is one, the UE is configured to select between a use of a first MIMO layer for communicating data to the base station transmitted using the vertical polarization and a second MIMO layer for communicating data to the base station transmitted using the horizontal polarization. In one subset of these embodiments that includes the optional generating 208, the second number of MIMO layers to be concurrently used for communicating data to the base station is different than the number of MIMO layers to be concurrently used for communicating data to the base station. In this subset of embodiments, the second number of MIMO layers to be concurrently used for transmitting data to the base station is indicated in the second set of one or more messages via an indication of a preferred UL bandwidth part in the second set of one or more messages. Alternatively (or additionally), in this subset of embodiments, at least one of the messages of the second set of one or more messages comprises one of a radio resource control (RRC) message, a MAC-CE, and downlink control information (DCI).

In certain embodiments of the method 200, for codebook based UL MIMO transmissions: the number of MIMO layers to be concurrently used for communicating data to the base station is two when the vertical polarization and the horizontal polarization are of similar strengths; the number of MIMO layers to be concurrently used for communicating data to the base station is one when the vertical polarization and the horizontal polarization are of dissimilar strengths; the number of SRS to be transmitted by the UE is one; and the supported maximum number of antenna ports per each SRS is two. In some of these embodiments, when the number of MIMO layers to be concurrently used for communicating data to the base station is one, the UE is configured to select between a use of a first MIMO layer for communicating data to the base station transmitted using the vertical polarization and a second MIMO layer for communicating data to the base station transmitted using the horizontal polarization. In one subset of these embodiments that includes the optional generating 208, the second number of MIMO layers to be concurrently used for communicating data to the base station is different than the number of MIMO layers to be concurrently used for communicating data to the base station. In this subset of embodiments, the second number of MIMO layers to be concurrently used for transmitting data to the base station is indicated in the second set of one or more messages via an indication of a preferred UL bandwidth part in the second set of one or more messages. Alternatively (or additionally), in this subset of embodiments, at least one message in the second set of one or more messages comprises one of a radio resource control (RRC) message, a MAC-CE, and downlink control information (DCI).

Figure 3:
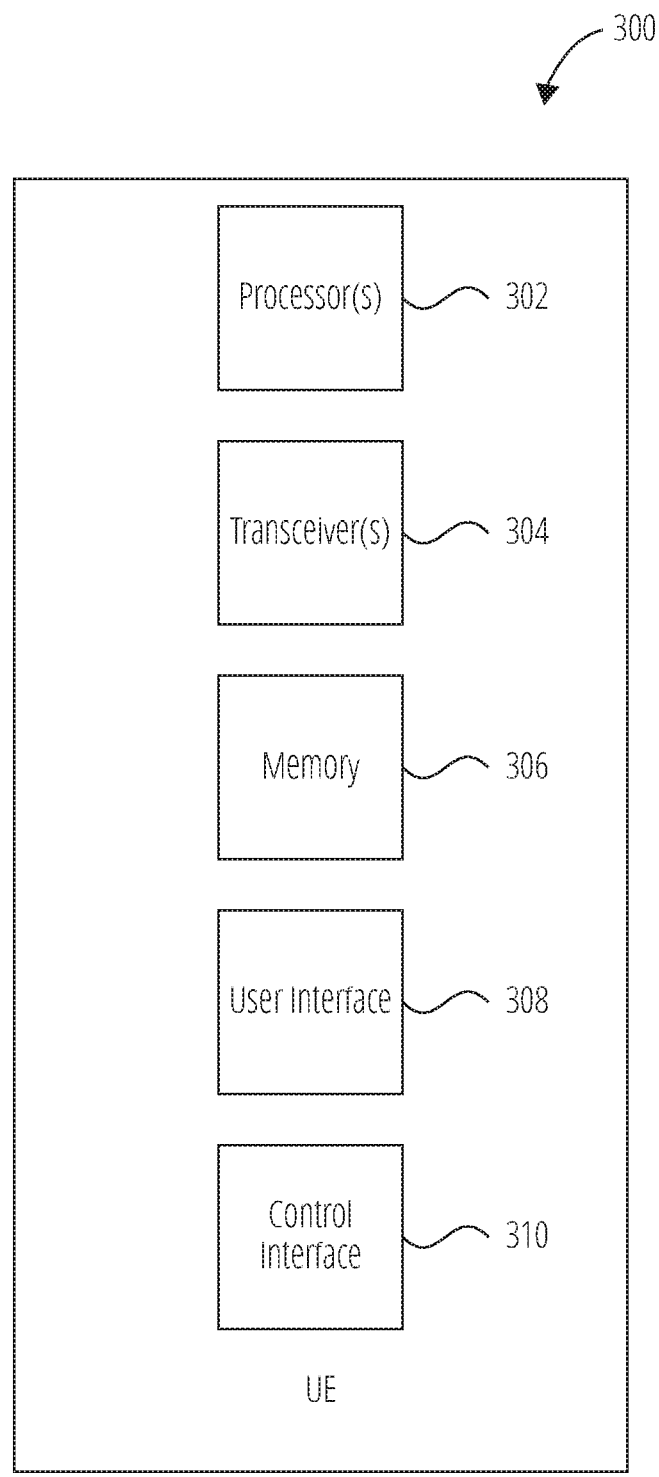
FIG. 3 illustrates a UE in accordance with one embodiment.

FIG. 3 is a block diagram of an example UE 300 configurable according to various embodiments of the present disclosure, including by execution of instructions on a computer-readable medium that correspond to any of the example methods and/or procedures described herein. The UE 300 comprises one or more processor 302, transceiver 304, memory 306, user interface 308, and control interface 310.

The one or more processor 302 may include, for example, an application processor, an audio digital signal processor, a central processing unit, and/or one or more baseband processors. Each of the one or more processor 302 may include internal memory and/or may include interface(s) to communication with external memory (including the memory 306). The internal or external memory can store software code, programs, and/or instructions for execution by the one or more processor 302 to configure and/or facilitate the UE 300 to perform various operations, including operations described herein. For example, execution of the instructions can configure the UE 300 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 304, user interface 308, and/or control interface 310. As another example, the one or more processor 302 may execute program code stored in the memory 306 or other memory that corresponds to MAC, RLC, PDCP, and RRC layer protocols standardized by 3GPP (e.g., for NR and/or LTE). As a further example, the processor 302 may execute program code stored in the memory 306 or other memory that, together with the one or more transceiver 304, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 306 may comprise memory area for the one or more processor 302 to store variables used in protocols, configuration, control, and other functions of the UE 300, including operations corresponding to, or comprising, any of the example methods and/or procedures described herein. Moreover, the memory 306 may comprise non-volatile memory (e.g., flash memory), volatile memory (e.g., static or dynamic RAM), or a combination thereof. Furthermore, the memory 306 may interface with a memory slot by which removable memory cards in one or more formats (e.g., SD Card, Memory Stick, Compact Flash, etc.) can be inserted and removed.

The one or more transceiver 30 may include radio-frequency transmitter and/or receiver circuitry that facilitates the UE 300 to communicate with other equipment supporting like wireless communication standards and/or protocols. For example, the one or more transceiver 304 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 302. The RF circuitry lay also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 304 includes a transmitter and a receiver that enable UE 300 to communicate with various 5G/NR networks according to various protocols and/or methods proposed for standardization by 3GPP and/or other standards bodies. For example, such functionality can operate cooperatively with the one or more processor 302 to implement a PHY layer based on OFDM, OFDMA, and/or SC-FDMA technologies, such as described herein with respect to other figures.

The user interface 308 may take various forms depending on particular embodiments, or can be absent from the UE 300. In some embodiments, the user interface 308 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 300 may comprise a tablet computing device including a larger touchscreen display. In such embodiments, one or more of the mechanical features of the user interface 308 may be replaced by comparable or functionally equivalent virtual user interface features (e.g., virtual keypad, virtual buttons, etc.) implemented using the touchscreen display, as familiar to persons of ordinary skill in the art. In other embodiments, the UE 300 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 300 having a touch screen display are capable of receiving user inputs, such as inputs related to exemplary methods and/or procedures described herein or otherwise known to persons of ordinary skill in the art.

In some exemplary embodiments of the present disclosure, the UE 300 may include an orientation sensor, which can be used in various ways by features and functions of the UE 300. For example, the UE 300 can use outputs of the orientation sensor to determine when a user has changed the physical orientation of the UE 300's touch screen display. An indication signal from the orientation sensor can be available to any application program executing on the UE 300, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 310 may take various forms depending on particular embodiments. For example, the control interface 310 may include an RS-232 interface, an RS-485 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1260 can comprise an IEEE 802.3 Ethernet interface such as described above. In some embodiments of the present disclosure, the control interface 310 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 300 may include more functionality than is shown in FIG. 3 including, for example, a video and/or still-image camera, microphone, media player and/or recorder, etc. Moreover, the one or more transceiver 304 may include circuitry for communication using additional radio-frequency communication standards including Bluetooth, GPS, and/or others. Moreover, the one or more processor 302 may execute software code stored in the memory 306 to control such additional functionality. For example, directional velocity and/or position estimates output from a GPS receiver can be available to any application program executing on the UE 300, including various exemplary methods and/or computer-readable media according to various exemplary embodiments of the present disclosure.

Figure 4:
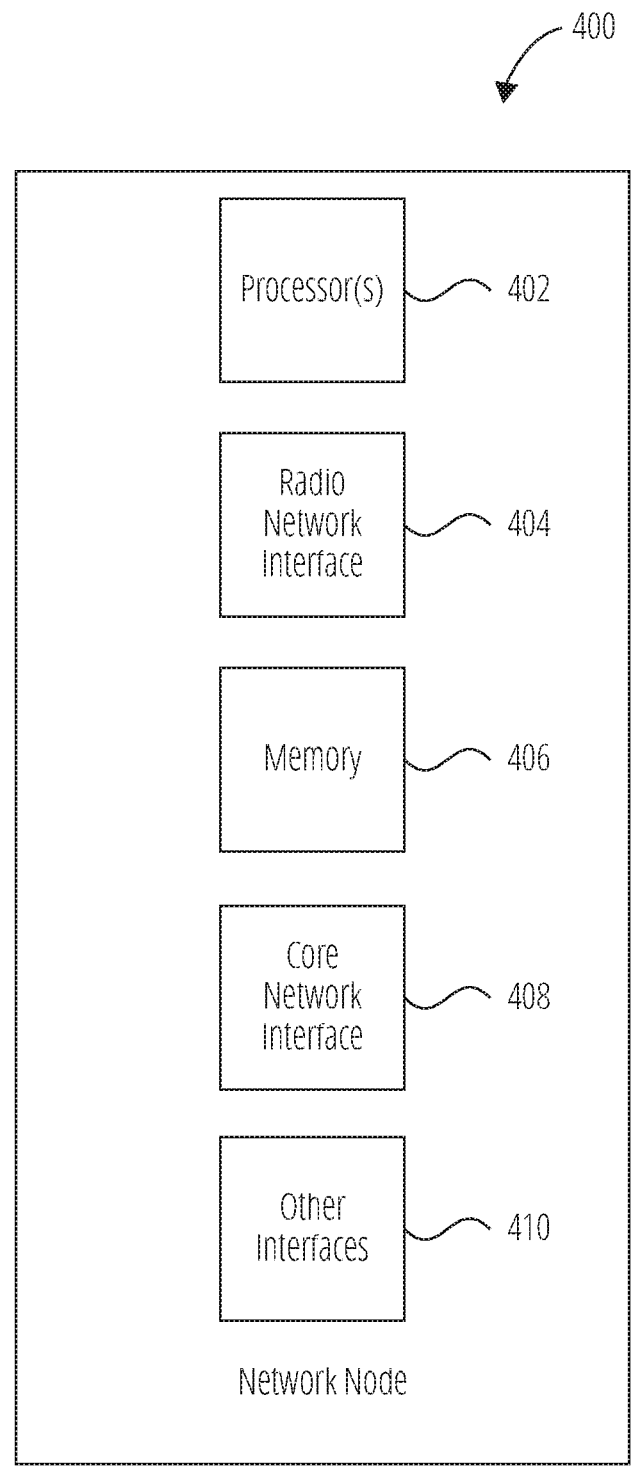
FIG. 4 illustrates a network node in accordance with one embodiment.

FIG. 4 is a block diagram of an example network node 400 configurable according to various embodiments of the present disclosure, including by execution of instructions on a computer-readable medium that correspond to any of the example methods and/or procedures described herein.

The network node 400 includes a one or more processor 402, a radio network interface 404, a memory 406, a core network interface 408, and other interfaces 410. The network node 400 may comprise, for example, a base station, eNB, gNB, access node, or component thereof.

The one or more processor 402 may include any type of processor or processing circuitry and may be configured to perform an of the methods or procedures disclosed herein. The memory 406 may store software code, programs, and/or instructions executed by the one or more processor 402 to configure the network node 400 to perform various operations, including operations described herein. For example, execution of such stored instructions can configure the network node 400 to communicate with one or more other devices using protocols according to various embodiments of the present disclosure, including one or more methods and/or procedures discussed above. Furthermore, execution of such stored instructions can also configure and/or facilitate the network node 400 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 404 and the core network interface 408. By way of example and without limitation, the core network interface 408 comprise an S1 interface and the radio network interface 404 may comprise a Uu interface, as standardized by 3GPP. The memory 406 may also store variables used in protocols, configuration, control, and other functions of the network node 400. As such, the memory 406 may comprise non-volatile memory (e.g., flash memory, hard disk, etc.), volatile memory (e.g., static or dynamic RAM), network-based (e.g., "cloud") storage, or a combination thereof.

The radio network interface 404 may include transmitters, receivers, signal processors, ASICs, antennas, beamforming units, and other circuitry that enables network node 400 to communicate with other equipment such as, in some embodiments, a plurality of compatible user equipment (UE). In some embodiments, the network node 400 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 404 may include a PHY layer based on OFDM, OFDMA, and/or SC-FDMA technologies. In some embodiments, the functionality of such a PEW layer can be provided cooperatively by the radio network interface 404 and the one or more processor 402.

The core network interface 408 may include transmitters, receivers, and other circuitry that enables the network node 400 to communicate with other equipment in a core network such as, in some embodiments, circuit-switched (CS) and/or packet-switched Core (PS) networks. In some embodiments, the core network interface 408 may include the S1 interface standardized by 3GPP. In some embodiments, the core network interface 408 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 408 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 410 may include transmitters, receivers, and other circuitry that enables the network node 400 to communicate with external networks, computers, databases, and the like for purposes of operations, administration, and maintenance of the network node 400 or other network equipment operably connected thereto.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 5:
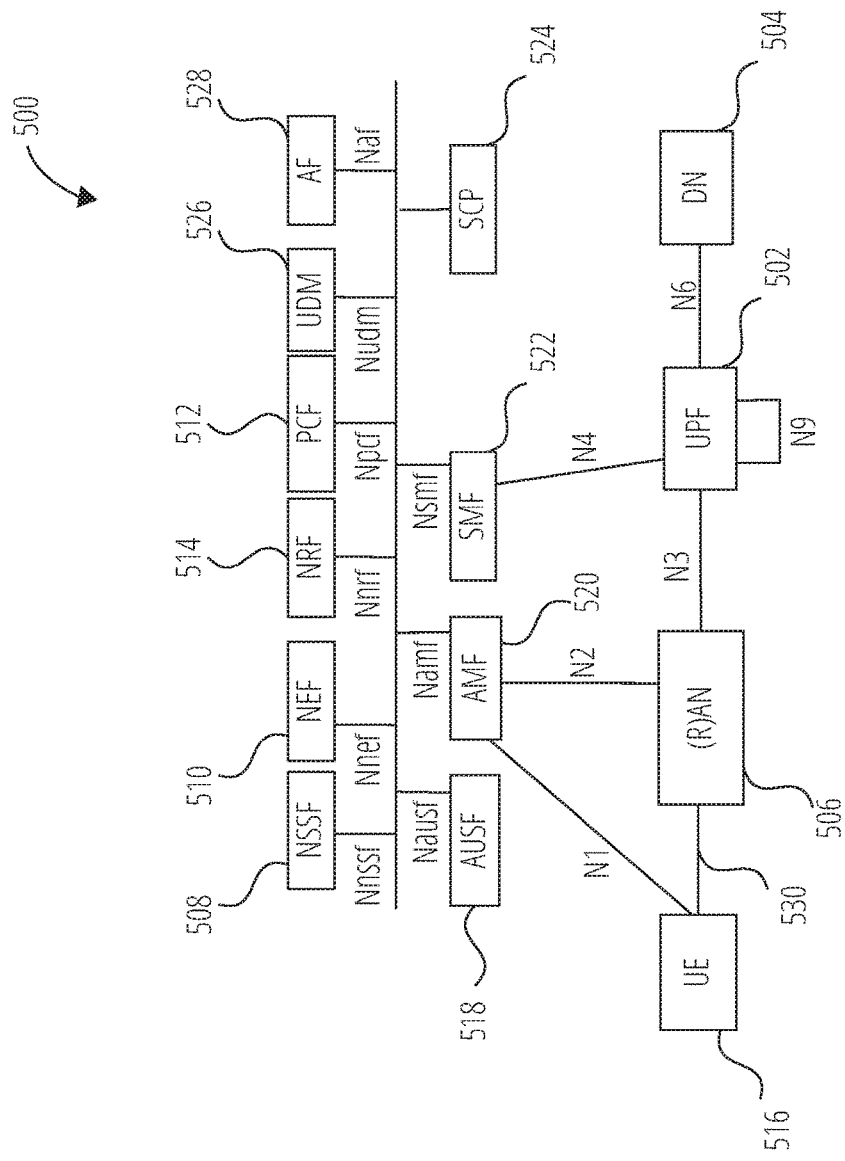
FIG. 5 illustrates an example service based architecture in accordance with certain embodiments.

FIG. 5 illustrates a service based architecture 500 in 5GS according to one embodiment. As described in 3GPP TS 23.501, the service based architecture 500 comprises NFs such as an NSSF 508, a NEF 510, an NRF 514, a PCF 512, a UDM 526, an AUSF 518, an AMF 520, an SMF 522, for communication with a UE 516, a (R)AN 506, a UPF 502, and a DN 504. The NFs and NF services can communicate directly, referred to as Direct Communication, or indirectly via a SCP 524, referred to as Indirect Communication. FIG. 5 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 5 are described below.

The NSSF 508 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 510 supports exposure of capabilities and events. NF capabilities and events may be securely exposed by the NEF 510 (e.g., for 3rd party, Application Functions, and/or Edge Computing). The NEF 510 may store/retrieve information as structured data using a standardized interface (Nudr) to a UDR. The NEF 510 may also secure provision of information from an external application to 3GPP network and may provide for the Application Functions to securely provide information to the 3GPP network (e.g., expected LTE behavior, 5GLAN group information, and service specific information), wherein the NEF 510 may authenticate and authorize and assist in throttling the Application Functions. The NEF 510 may provide translation of internal-external information by translating between information exchanged with the AF 528 and information exchanged with the internal network function. For example, the NEF 510 translates between an AF-Service-Identifier and internal 5G Core information such as DNN and S-NSSAI. The NEF 510 may handle masking of network and user sensitive information to external AF's according to the network policy. The NEF 510 may receive information from other network functions (based on exposed capabilities of other network functions), and stores the received information as structured data using a standardized interface to a UDR. The stored information can be accessed and re-exposed by the NEF 510 to other network functions and Application Functions, and used for other purposes such as analytics. For external exposure of services related to specific UE(s), the NEF 510 may reside in the HPLMN. Depending on operator agreements, the NEF 510 in the HPLMN may have interface(s) with NF(s) in the VPLMN. When a UE is capable of switching between EPC and 5GC, an SCEF+NEF may be used for service exposure.

The NRF 514 supports service discovery function by receiving an NF Discovery Request from an NF instance or SCP and providing the information of the discovered NF instances to the NF instance or SCP. The NRF 514 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 512 supports a unified policy framework to govern network behavior. The PCF 512 provides policy rules to Control Plane function(s) to enforce them. The PCF 512 accesses subscription information relevant for policy decisions in a Unified Data Repository (UDR). The PCF 512 may access the UDR located in the same PLMN as the PCF.

The UDM 526 supports generation of 3GPP AKA Authentication Credentials, User Identification Handling (e.g., storage and management of SUPT for each subscriber in the 5G system), de-concealment of a privacy-protected subscription identifier (SUCI), access authorization based on subscription data (e.g., roaming restrictions), UE's Serving NE Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 526 uses subscription data (including authentication data) that may be stored in a UDR, in which case a UDM implements the application logic and may not require an internal user data storage and several different UDMs may serve the same user in different transactions. The UDM 526 may be located in the HPLMN of the subscribers it serves, and may access the information of the UDR located in the same PLMN.

The AUSF 518 supports authentication for 3GPP access and entrusted non-3GPP access. The AUSF 518 may also provide support for Network Slice-Specific Authentication and Authorization.

The AMF 520 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 520. Regardless of the number of Network functions, in certain embodiments there is only one NAS interface instance per access network between the UE and the CN, terminated at one of the Network functions that implements at least NAS security and Mobility Management. The AMF 520 may also include policy related functionalities.

In addition to the functionalities described above, the AMF 520 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a co-ordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 522 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAB (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SME functionalities may be supported in a single instance of a SMF. However, in certain embodiments, not all of the functionalities are required to be supported in an instance of a Network Slice. In addition to the functionalities, the SMF 522 may include policy related functionalities.

The SCP 524 includes one or more of the following functionalities: Indirect Communication; Delegated Discovery; message forwarding and routing to destination NF/NF services; communication security (e.g., authorization of the NF Service Consumer to access the NE Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 524 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 516 may include a device with radio communication capabilities. For example, the UE 516 may comprise a smartphone (e.g., handheld touchscreen mobile computing devices connectable to one or more cellular networks). The UE 516 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 516 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 516 may be configured to connect or communicatively couple with the (R)AN 506 through a radio interface 530, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 516 and the (R)AN 506 may use a Uu interface (e.g., an LTE-Uu interface) to exchange control plane data via a protocol stack comprising a PHY layer, an MAC layer, an RLC layer, a PDCP layer, and an RRC layer. A DL transmission may be from the (R)AN 506 to the UE 516 and a UL transmission may be from the UE 516 to the (R)AN 506. The UE 516 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSCCH), and a Physical Sidelink Broadcast Channel (PSBCH).

The (R)AN 506 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 506 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 506) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 516 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 502 may act as an anchor point for intra-RAT and inter-RAT mobility, an external PDU session point of interconnect to the DN 504, and a branching point to support multi-homed PDU session. The UPF 502 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 502 may include an uplink classifier to support routing traffic flows to a data network. The DN 504 may represent various network operator services, Internet access, or third party services. The DN 504 may include, for example, an application server.

Figure 6:
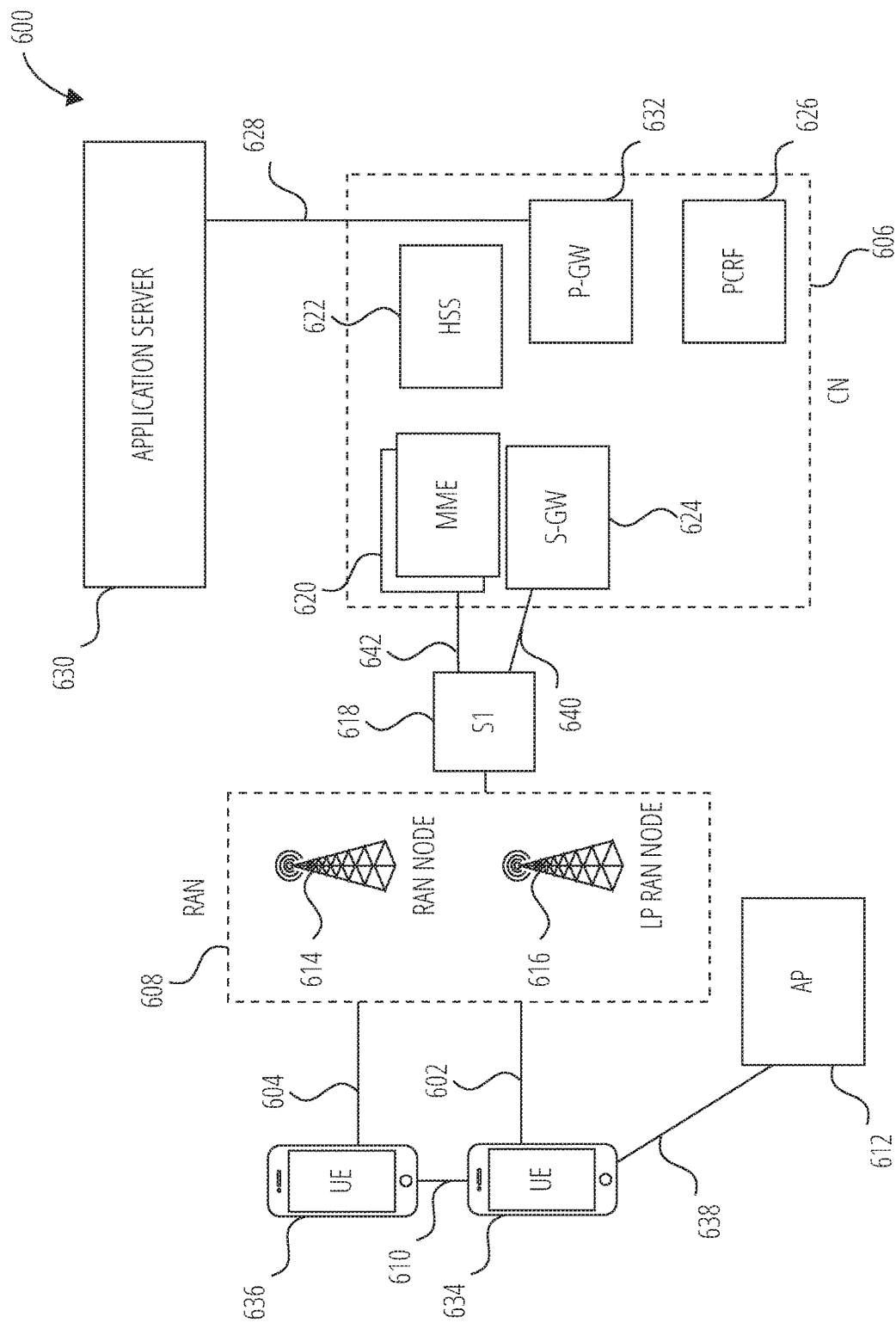
FIG. 6 illustrates a system in accordance with one embodiment.

FIG. 6 illustrates an architecture of a system 600 of a network in accordance with some embodiments. The system 600 includes one or more user equipment (UE), shown in this example as a UE 636 and a UE 634. The UE 636 and the UE 634 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 636 and the UE 634 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 636 and the UE 634 may be configured to connect, e.g., communicatively couple, with a radio access network (RAN), shown as RAN 608. The RAN 608 may be, for example, an Evolved Universal Mobile Telecommunications System (UMTS) Terrestrial Radio Access Network (E-UTRAN), a NextGen RAN (NG RAN), or some other type of RAN. The UE 636 and the UE 634 utilize connection 604 and connection 602, respectively, each of which comprises a physical communications interface or layer (discussed in further detail below); in this example, the connection 604 and the connection 602 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 636 and the UE 634 may further directly exchange communication data via a ProSe interface 610. The ProSe interface 610 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 634 is shown to be configured to access an access point (AP), shown as AP 612, via connection 638. The connection 638 can comprise a local wireless connection, such as a connection consistent with any IEEE 802.11 protocol, wherein the AP 612 would comprise a wireless fidelity (WiFi®) router. In this example, the AP 612 may be connected to the Internet without connecting to the core network of the wireless system (described in further detail below).

The RAN 608 can include one or more access nodes that enable the connection 604 and the connection 602. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 608 may include one or more RAN nodes for providing macrocells, e.g., macro RAN node 614, and one or more RAN nodes for providing femtocells or picocells (e.g., cells having smaller coverage areas, smaller user capacity, or higher bandwidth compared to macrocells), e.g., a low power (LP) RAN node such as LP RAN node 616.

Any of the macro RAN node 614 and the LP RAN node 616 can terminate the air interface protocol and can be the first point of contact for the UE 636 and the UE 634. In some embodiments, any of the macro RAN node 614 and the LP RAN node 616 can fulfill various logical functions for the RAN 608 including, but not limited to, radio network controller (RNC) functions such as radio bearer management, uplink and downlink dynamic radio resource management and data packet scheduling, and mobility management.

In accordance with some embodiments, the UE 636 and the UE 634 can be configured to communicate using Orthogonal Frequency-Division Multiplexing (OFDM) communication signals with each other or with any of the macro RAN node 614 and the LP RAN node 616 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-TDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the macro RAN node 614 and the LP RAN node 616 to the UE 636 and the UE 634, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 636 and the UE 634. The physical downlink control channel (PDCCH) may carry information about the transport format and resource allocations related to the PDSCH channel, among other things. It may also inform the UE 636 and the UE 634 about the transport format, resource allocation, and H-ARQ (Hybrid Automatic Repeat Request) information related to the uplink shared channel. Typically, downlink scheduling (assigning control and shared channel resource blocks to the UE 634 within a cell) may be performed at any of the macro RAN node 614 and the LP RAN node 616 based on channel quality information fed back from any of the UE 636 and UE 634. The downlink resource assignment information may be sent on the PDCCH used for (e.g., assigned to) each of the UE 636 and the UE 634.

The PDCCH may use control channel elements (CCEs) to convey the control information. Before being mapped to resource elements, the PDCCH complex-valued symbols may first be organized into quadruplets, which may then be permuted using a sub-block interleaves for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 608 is communicatively coupled to a core network (CN), shown as CN 606—via an S1 interface 618. In embodiments, the CN 606 may be an evolved packet core (EPC) network, a NextGen Packet Core (NPC) network, or some other type of CN. In this embodiment the S1 interface 618 is split into two parts: the S1-U interface 640, which carries traffic data between the macro RAN node 614 and the LP RAN node 616 and a serving gateway (S-GW), shown as S-GW 624, and an S1-mobility management entity (MME) interface, shown as S1-MME interface 642, which is a signaling interface between the macro RAN node 614 and LP RAN node 616 and the MME(s) 620.

In this embodiment, the CN 606 comprises the MME(s) 620, the S-GW 624, a Packet Data Network (PDN) Gateway (P-GW) (shown as P-GW 632), and a home subscriber server (HSS) (shown as HSS 622). The MME(s) 620 may be similar in function to the control plane of legacy Serving General Packet Radio Service (GPRS) Support Nodes (SGSN). The MME(s) 620 may manage mobility aspects in access such as gateway selection and tracking area list management. The HSS 622 may comprise a database for network users, including subscription-related information to support the network entities' handling of communication sessions. The CN 606 may comprise one or several HSS 622, depending on the number of mobile subscribers, on the capacity of the equipment, on the organization of the network, etc. For example, the HSS 622 can provide support for routing/roaming, authentication, authorization, naming/addressing resolution, location dependencies, etc.

The S-GW 624 may terminate the S1 interface 322 towards the RAN 608, and routes data packets between the RAN 608 and the CN 606. In addition, the S-GW 624 may be a local mobility anchor point for inter-RAN node handovers and also may provide an anchor for inter-3GPP mobility. Other responsibilities may include lawful intercept, charging, and some policy enforcement.

The P-GW 632 may terminate an SGi interface toward a PDN. The P-GW 632 may route data packets between the CN 606 (e.g., an EPC network) and external networks such as a network including the application server 630 (alternatively referred to as application function (AF)) via an Internet Protocol (IP) interface (shown as IP communications interface 628). Generally, an application server 630 may be an element offering applications that use IP bearer resources with the core network (e.g., UMTS Packet Services (PS) domain, LTE PS data services, etc.). In this embodiment, the P-GW 632 is shown to be communicatively coupled to an application server 630 via an IP communications interface 628. The application server 630 can also be configured to support one or more communication services (e.g., Voice-over-Internet Protocol (VoIP) sessions, PTT sessions, group communication sessions, social networking services, etc.) for the UE 636 and the UE 634 via the CN 606.

The P-GW 632 may further be a node for policy enforcement and charging data collection. A Policy and Charging Enforcement Function (PCRF) (shown as PCRF 626) is the policy and charging control element of the CN 606. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 632. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
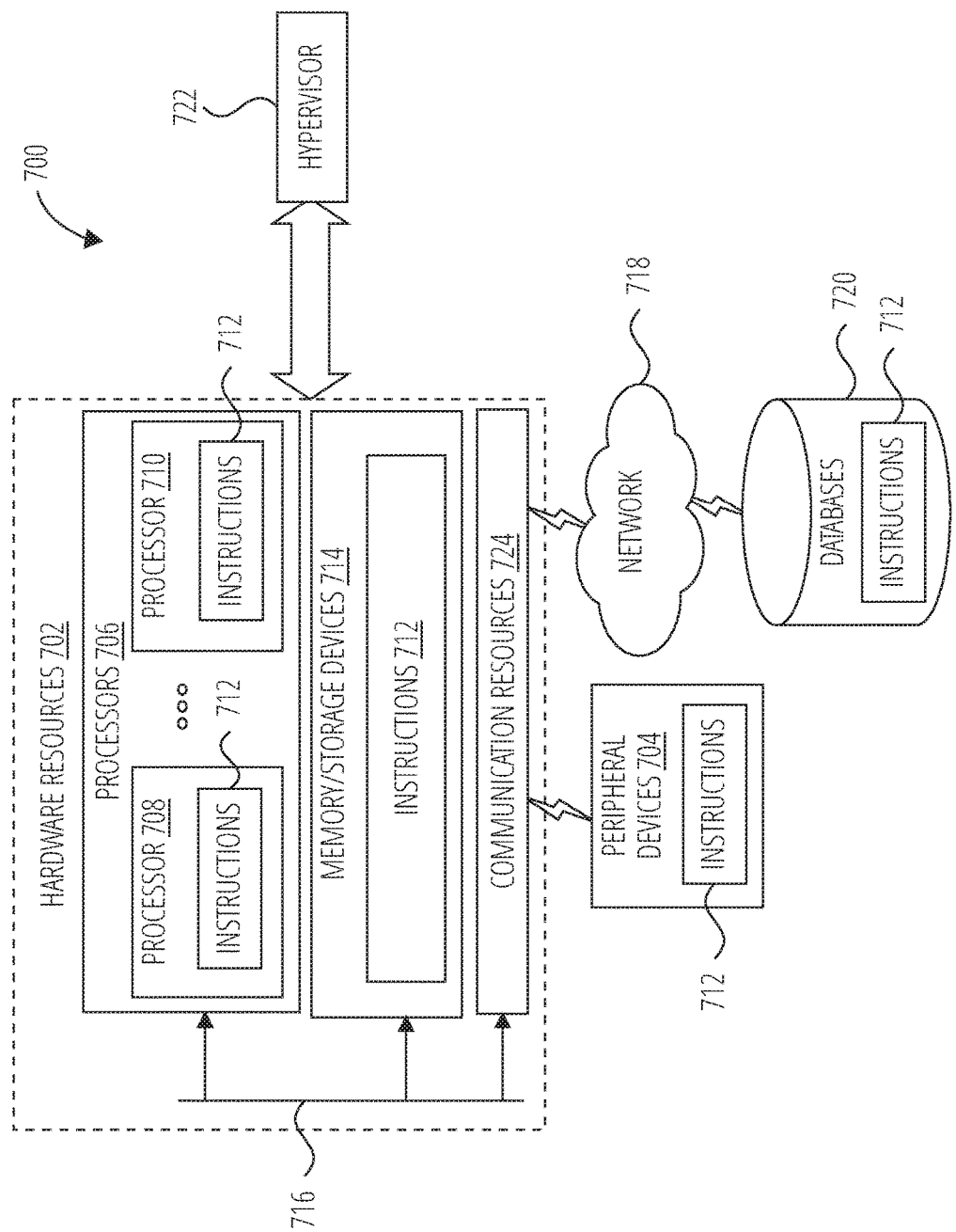
FIG. 7 illustrates components in accordance with one embodiment.

FIG. 7 is a block diagram illustrating components 700, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 702 including one or more processors 706 (or processor cores), one or more memory/storage devices 714, and one or more communication resources 724, each of which may be communicatively coupled via a bus 716. For embodiments where node virtualization (e.g., NFV) is utilized, a hypervisor 722 may be executed to provide an execution environment for one or more network slices/sub-slices to utilize the hardware resources 702.

The processors 706 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 708 and a processor 710.

The memory/storage devices 714 may include main memory, disk storage, or any suitable combination thereof. The memory/storage devices 714 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 724 may include interconnection or network interface components or other suitable devices to communicate with one or more peripheral devices 704 or one or more databases 720 via a network 718. For example, the communication resources 724 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 712 may comprise software, a program, an application, an applet, an app, or other executable code for causing at least any of the processors 706 to perform any one or more of the methodologies discussed herein. The instructions 712 may reside, completely or partially, within at least one of the processors 706 (e.g., within the processor's cache memory), the memory/storage devices 714, or any suitable combination thereof. Furthermore, any portion of the instructions 712 may be transferred to the hardware resources 702 from any combination of the peripheral devices 704 or the databases 720. Accordingly, the memory of the processors 706, the memory/storage devices 714, the peripheral devices 704, and the databases 720 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method of a user equipment (UE) for performing uplink (UL) multiple input multiple output (MIMO) transmissions, comprising: generating, at the UE, one or more messages to send to a base station, the one or more messages indicating: a number of MIMO layers to be concurrently used for communicating data to the base station, each of the MIMO layers to be transmitted using one of a vertical polarization and a horizontal polarization; a number of sounding reference signals (SRS) to be transmitted by the UE, each SRS to be transmitted using one of the vertical polarization and the horizontal polarization; a supported maximum number of antenna ports per each SRS; and sending, to the base station, the data using the indicated number of MIMO layers.

Example 2 is the method of Example 1, wherein for non-codebook based UL MIMO transmissions: the number of MIMO layers to be concurrently used for communicating data to the base station is one; the number of SRS to be transmitted by the UE is one; the supported maximum number of antenna ports per each SRS is one; and the one SRS and the one MIMO layer to be used are transmitted using the same polarization.

Example 3 is the method of Example 1, wherein for either of non-codebook based UL MIMO transmissions and codebook based UL MIMO transmissions: the number of MIMO layers to be concurrently used for communicating data to the base station is one; the number of SRS to be transmitted by the UE is two; the supported maximum number of antenna ports per each SRS is one; and the UE is configured to select between a use of a first MIMO layer for communicating data to the base station transmitted using the vertical polarization and a second MIMO layer for communicating data to the base station transmitted using the horizontal polarization.

Example 4 is the method of Example 3, wherein the selection between the first MIMO layer and the second MIMO layer occurs based on instructions from the base station.

Example 5 is the method of Example 3, wherein the selection between the first MIMO layer and the second MIMO layer occurs based on changes in relative strengths between the vertical polarization and the horizontal polarization.

Example 6 is the method of Example 1, wherein for non-codebook based UL MIMO transmissions: the number of MIMO layers to be concurrently used for communicating data to the base station is two when the vertical polarization and the horizontal polarization are of similar strengths; the number of MIMO layers to be concurrently used for communicating data to the base station is one when the vertical polarization and the horizontal polarization are of dissimilar strengths; the number of SRS to be transmitted by the UE is two; and the supported maximum number of antenna ports per each SRS is one.

Example 7 is the method of Example 6, wherein when the number of MIMO layers to be concurrently used for communicating data to the base station is one, the UE is configured to select between a use of a first MIMO layer for communicating data to the base station transmitted using the vertical polarization and a second MIMO layer for communicating data to the base station transmitted using the horizontal polarization.

Example 8 is the method of Example 6, further comprising: determining that a relative strength between the vertical polarization and the horizontal polarization has changed; and generating, at the UE, a second set of one or more messages to send to the base station, the second set of one or more messages indicating a second number of MIMO layers to be concurrently used for transmitting data to the base station, each of the second number of MIMO layers to be transmitted using one of the vertical polarization and the horizontal polarization; wherein the second number of MIMO layers to be concurrently used for communicating data to the base station is different than the number of MIMO layers to be concurrently used for communicating data to the base station.

Example 9 is the method of Example 8, wherein the second number of MIMO layers to be concurrently used for transmitting data to the base station is indicated in the second set of one or more messages via an indication of a preferred UL bandwidth part in the second set of one or more messages.

Example 10 is the method of any of Examples 8-9, wherein at least one of the messages of the second set of one or more messages comprises one of a radio resource control (RRC) message, a MAC-CE, and downlink control information (DCI).

Example 11 is the method of Example 1, wherein for codebook based UL MIMO transmissions: the number of MIMO layers to be concurrently used for communicating data to the base station is two when the vertical polarization and the horizontal polarization are of similar strengths; the number of MIMO layers to be concurrently used for communicating data to the base station is one when the vertical polarization and the horizontal polarization are of dissimilar strengths; the number of SRS to be transmitted by the UE is one; and the supported maximum number of antenna ports per each SRS is two.

Example 12 is the method of Example 11, wherein when the number of MIMO layers to be concurrently used for communicating data to the base station is one, the UE is configured to select between a use of a first MIMO layer for communicating data to the base station transmitted using the vertical polarization and a second MIMO layer for communicating data to the base station transmitted using the horizontal polarization.

Example 13 is the method of Example 11, further comprising: determining that a relative strength between the vertical polarization and the horizontal polarization has changed; and generating, at the UE, a second set of one or more messages to send to the base station, the second set of one or more messages indicating a second number of MIMO layers to be concurrently used for transmitting data to the base station, each of the second number of MIMO layers to be transmitted using one of the vertical polarization and the horizontal polarization; wherein the second number of MIMO layers to be concurrently used for communicating data to the base station is different than the number of MIMO layers to be concurrently used for communicating data to the base station.

Example 14 is the method of Example 13, wherein the second number of MIMO layers to be concurrently used for transmitting data to the base station is indicated in the second set of one or more messages via an indication of a preferred UL bandwidth part in the second set of one or more messages.

Example 15 is the method of any of Examples 13-14, wherein at least one message in the second set of one or more messages comprises one of a radio resource control (RRC) message, a MAC-CE, and downlink control information (DCI).

Example 16 is a computing apparatus of a UE for performing uplink (UL) multiple input multiple output (MIMO) transmissions, comprising: memory; and processing circuitry connected with the memory and configured to: generate one or more messages for the UE to send to a base station, the one or more messages indicating: a number of MIMO layers to be concurrently used for communicating data to the base station, each of the MIMO layers to be transmitted using one of a vertical polarization and a horizontal polarization; a number of sounding reference signals (SRS) to be transmitted by the UE, each SRS to be transmitted using one of the vertical polarization and the horizontal polarization; a supported maximum number of antenna ports per each SRS; and instruct the UE to send, to the base station, the data using the indicated number of MIMO layers.

Example 17 is the computing apparatus of Example 16, wherein for non-codebook based UL MIMO transmissions: the number of MIMO layers to be concurrently used for communicating data to the base station is one; the number of SRS to be transmitted by the UE is one; the supported maximum number of antenna ports per each SRS is one; and the processing circuitry is further configured to instruct the UE to transmit the one SRS and the one MIMO layer to be used on the same polarization.

Example 18 is the computing apparatus of Example 16, wherein for either of non-codebook based UL MIMO transmissions and codebook based UL MIMO transmissions: the number of MIMO layers to be concurrently used for communicating data to the base station is one; the number of SRS to be transmitted by the UE is two; the supported maximum number of antenna ports per each SRS is one; and the processing circuitry is further configured to select between a use of a first MIMO layer for communicating data to the base station transmitted using the vertical polarization and a second MIMO layer for communicating data to the base station transmitted using the horizontal polarization.

Example 19 is the computing apparatus of Example 18, wherein the selection between the first MIMO layer and the second MIMO layer occurs based on instructions from the base station.

Example 20 is the computing apparatus of Example 18, wherein the selection between the first MIMO layer and the second MIMO layer occurs based on changes in relative strengths between the vertical polarization and the horizontal polarization.

Example 21 is the computing apparatus of Example 16, wherein for non-codebook based UL MIMO transmissions: the number of MIMO layers to be concurrently used for communicating data to the base station is two when the vertical polarization and the horizontal polarization are of similar strengths; the number of MIMO layers to be concurrently used for communicating data to the base station is one when the vertical polarization and the horizontal polarization are of dissimilar strengths; the number of SRS to be transmitted by the UE is two; and the supported maximum number of antenna ports per each SRS is one.

Example 22 is the computing apparatus of Example 21, wherein when the number of MIMO layers to be concurrently used for communicating data to the base station is one, the processing circuitry is configured select between a use of a first MIMO layer for communicating data to the base station transmitted using the vertical polarization and a second MIMO layer for communicating data to the base station transmitted using the horizontal polarization.

Example 23 is the computing apparatus of Example 21, wherein the processing circuitry is further configured to: determine that a relative strength between the vertical polarization and the horizontal polarization has changed; and generate a second set of one or more messages for the UE to send to the base station, the second set of one or more messages indicating a second number of MIMO layers to be concurrently used for transmitting data to the base station, each of the second number of MIMO layers to be transmitted using one of the vertical polarization and the horizontal polarization; wherein the second number of MIMO layers to be concurrently used for communicating data to the base station is different than the number of MIMO layers to be concurrently used for communicating data to the base station.

Example 24 is the computing apparatus of Example 23, wherein the second number of MIMO layers to be concurrently used for transmitting data to the base station is indicated in the second set of one or more messages via an indication of a preferred UL bandwidth part in the second set of one or more messages.

Example 25 is the computing apparatus of any of Examples 23-24, wherein at least one of the messages of the second set of one or more messages comprises one of a radio resource control (RRC) message, a MAC-CE, and downlink control information (DCI).

Example 26 is the computing apparatus of Example 16, wherein for codebook based UL MIMO transmissions: the number of MIMO layers to be concurrently used for communicating data to the base station is two when the vertical polarization and the horizontal polarization are of similar strengths; the number of MIMO layers to be concurrently used for communicating data to the base station is one when the vertical polarization and the horizontal polarization are of dissimilar strengths; the number of SRS to be transmitted by the UE is one; and the supported maximum number of antenna ports per each SRS is two.

Example 27 is the computing apparatus of Example 26, wherein when the number of MIMO layers to be concurrently used for communicating data to the base station is one, the processing circuitry is configured to select between a use of a first MIMO layer for communicating data to the base station transmitted using the vertical polarization and a second MIMO layer for communicating data to the base station transmitted using the horizontal polarization.

Example 28 is the computing apparatus of Example 26, wherein the processing circuitry is further configured to: determine that a relative strength between the vertical polarization and the horizontal polarization has changed; and generate a second set of one or more messages for the UE to send to the base station, the second set of one or more messages indicating a second number of MIMO layers to be concurrently used for transmitting data to the base station, each of the second number of MIMO layers to be transmitted using one of the vertical polarization and the horizontal polarization; wherein the second number of MIMO layers to be concurrently used for communicating data to the base station is different than the number of MIMO layers to be concurrently used for communicating data to the base station.

Example 29 is the computing apparatus of Example 28, wherein the second number of MIMO layers to be concurrently used for transmitting data to the base station is indicated in the second set of one or more messages via an indication of a preferred UL bandwidth part in the second set of one or more messages.

Example 30 is the computing apparatus of any of Examples 28-29, at least one message in the second set of one or more messages comprises one of a radio resource control (RRC) message, a MAC-CE, and downlink control information (DCI).

Example 31 may include an apparatus comprising means to perform one or more elements of a method described in or related to any of the above Examples, or any other method or process described herein.

Example 32 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 33 may include an apparatus comprising logic, modules, or circuitry to perform one or more elements of a method described in or related to any of the above Examples, or any other method or process described herein.

Example 34 may include a method, technique, or process as described in or related to any of the above Examples, or portions or parts thereof.

Example 35 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 36 may include a signal as described in or related to any of e above Examples, or portions or parts thereof.

Example 37 may include a datagram, packet, frame, segment, protocol data unit (PDU), or message as described in or related to any of the above Examples, or portions or parts thereof, or otherwise described in the present disclosure.

Example 38 may include a signal encoded with data as described in or related to any of the above Examples, or portions or parts thereof, or otherwise described in the present disclosure.

Example 39 may include a signal encoded with a datagram, packet, frame, segment, PDU, or message as described in or related to any of the above Examples, or portions or parts thereof, or otherwise described in the present disclosure.

Example 40 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 41 may include a computer program comprising instructions, wherein execution of the program by a processing element is to cause the processing element to carry out the method, techniques, or process as described in or related to any of the above Examples, or portions thereof.

Example 42 may include a signal a wireless network as shown and described herein.

Example 43 may include a method of communicating in a wireless network as shown and described herein.

Example 44 may include a system for providing wireless communication as shown and described herein.

Example 45 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE) for performing uplink (UL) multiple input multiple output (MIMO) transmissions, comprising:
   generating, at the UE, first one or more messages to send to a base station, the first one or more messages indicating:
   a first number of MIMO layers to be concurrently used for communicating data to the base station, each of the first number of the MIMO layers to be transmitted using one of a vertical polarization and a horizontal polarization;
   a number of sounding reference signals (SRS) to be transmitted by the UE, each SRS of the number of the SRS to be transmitted using one of the vertical polarization and the horizontal polarization; and
   a supported maximum number of antenna ports per each of the SRS of the number of the SRS;
   sending, to the base station, the data using the first number of the MIMO layers;
   determining that a relative strength between the vertical polarization and the horizontal polarization has changed; and
   generating, at the UE, second one or more messages to send to the base station, the second one or more messages indicating a second number of MIMO layers to be concurrently used for transmitting the data to the base station, each of the second number of the MIMO layers to be transmitted using one of the vertical polarization and the horizontal polarization;
   wherein the second number of the MIMO layers to be concurrently used for communicating the data to the base station is different than the first number of the MIMO layers to be concurrently used for communicating the data to the base station.

2. The method of claim 1, wherein for non-codebook based UL MIMO transmissions:
   the first number of the MIMO layers to be concurrently used for communicating data to the base station is one;
   the number of the SRS to be transmitted by the UE is one;
   the supported maximum number of antenna ports per each the SRS of the number of the SRS is one; and
   the one SRS and the one MIMO layer to be used are transmitted using the same polarization.

3. The method of claim 1, wherein for either of non-codebook based UL MIMO transmissions and codebook based UL MIMO transmissions:
   the first number of the MIMO layers to be concurrently used for communicating the data to the base station is one;
   the number of the SRS to be transmitted by the UE is two;
   the supported maximum number of antenna ports per each of the SRS of the number of the SRS is one; and
   the UE is configured to select between a use of a first MIMO layer for communicating data to the base station transmitted using the vertical polarization and a second MIMO layer for communicating the data to the base station transmitted using the horizontal polarization.

4. The method of claim 3, wherein the selection between the first MIMO layer and the second MIMO layer occurs based on instructions from the base station.

5. The method of claim 3, wherein the selection between the first MIMO layer and the second MIMO layer occurs based on changes in the relative strengths between the vertical polarization and the horizontal polarization.

6. The method of claim 1, wherein for non-codebook based UL MIMO transmissions:
   the first number of the MIMO layers to be concurrently used for communicating the data to the base station is two when the vertical polarization and the horizontal polarization are of similar strengths;
   the first number of the MIMO layers to be concurrently used for communicating the data to the base station is one when the vertical polarization and the horizontal polarization are of dissimilar strengths;
   the number of the SRS to be transmitted by the UE is two; and the supported maximum number of the antenna ports per each the SRS of the number of the SRS is one.

7. The method of claim 6, wherein when the first number of the MIMO layers to be concurrently used for communicating the data to the base station is one, the UE is configured to select between a use of a first MIMO layer for communicating the data to the base station transmitted using the vertical polarization and a second MIMO layer for communicating the data to the base station transmitted using the horizontal polarization.

8. The method of claim 6, wherein the second number of the MIMO layers to be concurrently used for transmitting the data to the base station is indicated in the second one or more messages via an indication of a preferred UL bandwidth part in the second one or more messages.

9. The method of claim 6, wherein at least one of the messages of the second one or more messages comprises one of a radio resource control (RRC) message, a MAC-CE, and downlink control information (DCI).

10. The method of claim 1, wherein for codebook based UL MIMO transmissions:
the first number of the MIMO layers to be concurrently used for communicating the data to the base station is two when the vertical polarization and the horizontal polarization are of similar strengths;
the first number of the MIMO layers to be concurrently used for communicating the data to the base station is one when the vertical polarization and the horizontal polarization are of dissimilar strengths;
the number of the SRS to be transmitted by the UE is one; and
the supported maximum number of the antenna ports per each of the SRS of the number of the SRS is two.

11. The method of claim 10, wherein when the first number of the MIMO layers to be concurrently used for communicating the data to the base station is one, the UE is configured to select between a use of a first MIMO layer for communicating the data to the base station transmitted using the vertical polarization and a second MIMO layer for communicating the data to the base station trans mitted using the horizontal polarization.

12. The method of claim 10, wherein the second number of the MIMO layers to be concurrently used for transmitting the data to the base station is indicated in the second one or more messages via an indication of a preferred UL bandwidth part in the second one or more messages.

13. The method of claim 10, wherein at least one message in the second one or more messages comprises one of a radio resource control (RRC) message, a MAC-CE, and downlink control information (DCI).

14. A computing apparatus of a UE for performing uplink (UL) multiple input multiple output (MIMO) transmissions, comprising:
memory; and
processing circuitry connected with the memory and configured to:
generate first one or more messages for the UE to send to a base station, the first one or more messages indicating:
a first number of MIMO layers to be concurrently used for communicating data to the base station, each of the first number of the MIMO layers to be transmitted using one of a vertical polarization and a horizontal polarization;
a number of sounding reference signals (SRS) to be transmitted by the UE, each of the SRS of the number of the SRS to be transmitted using one of the vertical polarization and the horizontal polarization; and
a supported maximum number of antenna ports per each of the SRS of the number of the SRS;
instruct the UE to send, to the base station, the data using an indicated first number of the MIMO layers;
determine that a relative strength between the vertical polarization and the horizontal polarization has changed; and
generate, at the UE, second one or more messages to send to the base station, the second one or more messages indicating a second number of MIMO layers to be concurrently used for transmitting the data to the base station, each of the second number of the MIMO layers to be transmitted using one of the vertical polarization and the horizontal polarization;
wherein the second number of the MIMO layers to be concurrently used for communicating the data to the base station is different than the first number of the MIMO layers to be concurrently used for communicating the data to the base station.

15. The computing apparatus of claim 14, wherein for non-codebook based UL MIMO transmissions:
the first number of the MIMO layers to be concurrently used for communicating the data to the base station is one;
the number of the SRS to be transmitted by the UE is one;
the supported maximum number of the antenna ports per each of the number of the SRS is one; and
the processing circuitry is further configured to instruct the UE to transmit the one SRS and the one MIMO layer to be used on the same polarization.

16. The computing apparatus of claim 14, wherein for either of non-codebook based UL MIMO transmissions and codebook based UL MIMO transmissions:
the first number of the MIMO layers to be concurrently used for communicating the data to the base station is one;
the number of the SRS to be transmitted by the UE is two;
the supported maximum number of the antenna ports per each of the number of the SRS is one; and
the processing circuitry is further configured to select between a use of a first MIMO layer for communicating the data to the base station transmitted using the vertical polarization and a second MIMO layer for communicating the data to the base station transmitted using the horizontal polarization.

17. The computing apparatus of claim 16, wherein the selection between the first MIMO layer and the second MIMO layer occurs based on instructions from the base station.

18. The computing apparatus of claim 16, wherein the selection between the first MIMO layer and the second MIMO layer occurs based on changes in the relative strengths between the vertical polarization and the horizontal polarization.

* * * * *